(12) United States Patent
Welter et al.

(10) Patent No.: US 6,631,408 B1
(45) Date of Patent: Oct. 7, 2003

(54) TESTING WEB SITES

(75) Inventors: Peter J. Welter, Erie, CO (US); John R. Meier, Longmont, CO (US)

(73) Assignee: Freshwater Software, Inc., Boulder, CO (US)

( * ) Notice: Subject to any disclaimer, the term of this patent is extended or adjusted under 35 U.S.C. 154(b) by 166 days.

(21) Appl. No.: 09/651,833

(22) Filed: Aug. 30, 2000

Related U.S. Application Data

(63) Continuation of application No. 09/170,130, filed on Oct. 12, 1998, now Pat. No. 6,138,157.

(51) Int. Cl.$^7$ .............................................. G06F 13/00
(52) U.S. Cl. ...................................................... 709/223
(58) Field of Search ................................ 709/200, 203, 709/220, 224; 714/100, 38, 4, 5, 47; 717/100, 124, 126, 131

(56) References Cited

U.S. PATENT DOCUMENTS

| | | | |
|---|---|---|---|
| 5,870,559 A | 2/1999 | Leshem et al. | 395/200.54 |
| 5,958,008 A | 9/1999 | Pogrebisky et al. | 709/223 |
| 6,003,143 A | 12/1999 | Kim et al. | 714/38 |
| 6,012,087 A | 1/2000 | Freivald et al. | 709/218 |
| 6,185,701 B1 * | 2/2001 | Marullo et al. | 714/38 |

FOREIGN PATENT DOCUMENTS

| | | |
|---|---|---|
| JP | 05216827 A | 8/1993 |

OTHER PUBLICATIONS

F. Douglis, T. Ball, Y. Chen, and E. Koutsofios, The AT & T Internet Difference Engine: Tracking and viewing changes on the web. Baltzer Science Publishers BV, 27–44 (1998).
F. van Harmelen and J. van deer Meer, WebMaster: Knowledge–Based Verification of Web–Pages. 12$^{th}$ International Conference on Industrial and Engineering Applications of Artificial Intelligence and Expert Systems, IEA/AIE–99, Cairo, Egypt, 256–265 (1999).

* cited by examiner

Primary Examiner—Robert B. Harrell
(74) Attorney, Agent, or Firm—Perkins Coie LLP

(57) ABSTRACT

A method for testing a web site includes formulating a test configuration file including a series of test inquiries for a web site to be tested, initiating a HTTP communication to form a connection with the web site, and repetitively communicating with the web site to test for a variety of errors. The repetitive communication preferably includes receiving HTML from the web site, analyzing the HTML for errors and storing results in the database, and formulating a new HTTP communication based upon the received HTML and the test configuration file. Preferably, the test configuration file is created by sending HTML comprising a blank testing form to a web browser, receiving HTTP from the web browser as a submission from the HTML testing form, and developing the test configuration file from the HTTP.

18 Claims, 18 Drawing Sheets f r e s h w a t e r  s o f t w a r e (download | order | products | support | search | about us)

Is your business-critical web site up right now?

How do you know?

If you had SiteScope and SiteSeer, not only would you know if your web site was up, you would be confident that you would be notified immediately if a problem did occur. SiteScope allows you to monitor everything from memory and disk space usage to URL and service availability. Error notification is available via e-mail, pager, and SNMP traps. SiteScope can also run recovery scripts to correct common problems. The SiteSeer service monitors your site remotely, letting you know of problems your visitors are experiencing, but you're unaware of. Together, SiteScope and SiteSeer help ensure that your site is up and running smoothly 24 hours a day, 7 days a week.

SiteScope Software

Version 3.0 Available Now!
- 24 hour monitoring of web pages, forms, servers, and more...
- Immediate error notification via e-mail, pager, or SNMP trap
- Escalation of notification
- Automatic error recovery
- Ability to integrate with enterprise solutions Review SiteScope 3.0's release notes!

[try it] [buy it] [more info]

SiteSeer Service

E-commerce Transaction Testing Available!
- Remote web site monitoring 24 hours a day
- Support for secure URLs
- Verification of password protected pages
- String matching on both page content and error messages

[try it] [buy it] [more info]

Fresh News...

▶PCToday raves about SiteScope in the work place in its February issue. Full Story ▶DIGEX chooses SiteScope to monitor the world's largest dedicated server web site management facilities. Full Story ▶SiteScope receives a Five Palm Tree rating from Beverly Hills Software. Full Story "They've found an important niche from a web server administrator perspective... It's expandable and customizable; it's a fantastic product."
-- Brad Hogan, Newbridge Networks. More customer quotes

HOME | ORDER | PRODUCTS | SUPPORT | SEARCH | ABOUT US   ←—80 visit us at www.freshtech.com
Freshwater
Software™      82

78

Contact Us

© Copyright 1998 by Freshwater Software, Inc., Boulder, Colorado. All rights reserved.

FIG. 3A freshwater software ( home | order | products | support | search | about us )

Search Results

Searching for: John

- *Who We Are (Thu 5 Feb 98)*
  "john" 5 (John)
- *SiteScopeFAQ (Wed 3 Jun 98)*
  "john" 4 (John)
- *Freshwater Software Contact Information (Thu 5 Feb 98)*
  "john" 3 (John)
- *Chief Technical Officer (Tue 26 May 98)*
  "john" 2 (John)
- *Escalation Rules (Fri 9 Jan 98)*
  "john" 2 (John)
- *DIGEX Selects Freshwater Software's SiteScope to Enhance Reliability for its Web Site Management Customers (Thu 5 Feb 98)*
  "john" 1 (John)
- *MANAGEMENT BIOGRAPHIES (Thu 5 Feb 98)*
  "john" 1 (John)
- *Freshwater Software™ Press Release (Fri 30 May 97)*
  "john" 1 (John)
- *THE FRESHWATER SOFTWARE PRESS ROOM (Thu 5 Feb 98)*
  "john" 1 (John)
- *Freshwater Software™ Press Release (Thu 5 Feb 98)*
  "john" 1 (John)

---

HOME | ORDER | PRODUCTS | SUPPORT | SEARCH | ABOUT US visit us at www.freshtech.com

Freshwater Software™

90

Contact Us

© Copyright 1998 by Freshwater Software, Inc., Boulder, Colorado. All rights reserved.

This searchable archive was implemented with the ICE search engine

☐ Disable — 124 temporarily disable monitor sampling and alerting — 126

Step 1 POST Data: Name = ABC / Address = DEF
optional name=value variables, one per line, to send with a POST request for this step

Step 1 Match Content: Thank you for entering your name — 128
optional text to match against content of the URL for this step

Step 1 Error If Match: Invalid entry — 130
optionally generate an error if the content of the URL for this step contains this text

Step 1 Authorization User Name: PAUL — 132
optional user name if the URL for this step requires authorization

Step 1 Password: SECRET — 134
optional password if the URL for this step requires authorization

Step 2 POST Data:
optional name=value variables, one per line, to send with a POST request for this step

Step 2 Match Content:
optional text to match against content of the URL for this step

Step 2 Error If Match:
optionally generate an error if the content of the URL for this step contains this text

Step 2 Authorization User Name:
optional user name if the URL for this step requires authorization

Step 2 Password:
optional password if the URL for this step requires authorization

Step 3 POST Data:
optional name=value variables, one per line, to send with a POST request for this step

Step 3 Match Content:
optional text to match against content of the URL for this step

Step 3 Error If Match:
optionally generate an error if the content of the URL for this step contains this text

Step 3 Authorization User Name:
optional user name if the URL for this step requires authorization

FIG. 4B

| Field | Description |
|---|---|
| Step 3 Password | optional password if the URL for this step requires authorization |
| Step 4 POST Data | optional name=value variables, one per line, to send with a POST request for this step |
| Step 4 Match Content | optional text to match against content of the URL for this step |
| Step 4 Error If Match | optionally generate an error if the content of the URL for this step contains this text |
| Step 4 Authorization User Name | optional user name if the URL for this step requires authorization |
| Step 4 Password | optional password if the URL for this step requires authorization |
| Verify Error | if the monitor detects an error, immediately perform the check again to verify the error. |
| 138 — Update every (on errors) | [60] [minutes] /136 — the amount of time between checks whenever the status of the monitor is not ok, the Update value from above is used if this is left blank |
| Schedule | [every day, all day] /140 — schedule for the monitor to be enabled - for example, disable Sunday from 10:00 to 14:00, if blank monitor is always enabled |
| 142 — Edit Schedules | |
| Monitor Description | /144 — additional description of monitor that appears on Monitor Detail page (optional) |
| Report Description | /146 — additional description of monitor that appears on Reports and in monitor popup info (optional) |
| Timeout | [60] /148 — the time out, in seconds, to wait for entire sequence to complete |
| HTTP Proxy | 150A — optional proxy server to use including port (example: proxy.freshtech.com:8080) |
| Proxy Server User Name | 150B — optional user name if the proxy server requires authorization |
| Proxy Server Password | 150C — optional password if the proxy server requires authorization |
| List Order | [last] /152 — choose where this monitor appears in the list of monitors on the Monitor Detail page |
| Error if | [status != 200 (default)] /154 [!=] [ ] |
| 122 — Warning if | [status = = -994 (default)] [= =] [ ] |
| [Add] Monitor | 156 |

```
                                                            example.mg
            _id=1
            _class=URLSequenceMonitor
            _name=URL Transaction: http://www.freshtech.com
            _description=
  174 ─┐    _monitorDescription=Example transaction of 5 steps
        └─► _frequency=600
            _timeout=60
            _errorFrequency=120
            _disabled=false
            _verifyError=false
            _proxy=
            _proxyusername=
            _proxypassword=                               172
            _schedule=
         ┌─ _referenceType1=url
         │  _reference1=http://www.freshtech.com
         │  _errorContent1=Not Found
  176 ──┤   _username1=
         │  _password1=
         └─ _content1=
         ┌─ _referenceType2=link
         │  _reference2=SEARCH
         │  _errorContent2=
  178 ──┤   _username2=
         │  _password2=
         └─ _content2=
         ┌─ _referenceType3=form
         │  _reference3=Find Documents
         │  _postData3=KEYWORDS=John
  180 ──┤   _content3=Officer
         │  _errorContent3=
         │  _username3=
         └─ _password3=
         ┌─ _referenceType4=url
         │  _reference4=http://www.macromedia.com/index.html
         │  _errorContent4=
  182 ──┤   _username4=
         │  _password4=
         └─ _content4=
         ┌─ _referenceType5=frame
         │  _reference5=mm_nav
         │  _errorContent5=
  184 ──┤   _username5=
         │  _password5=
         └─ _content5=
```

FIG. 6

TESTING WEB SITES

RELATED APPLICATIONS

This application is a continuation of U.S. Application 09/170,130 filed on Oct. 12, 1998 now U.S. Pat. No. 6,138,157.

BACKGROUND OF THE INVENTION

This invention relates generally to wide area networks, and more particularly to the testing of web sites hosted by web servers coupled to a TCP/IP protocol network.

The Internet has, of late, become ubiquitous. The Internet is a robust, Wide Area Network (WAN) of networks which permits communication among computers, networks, and other digital devices which adhere to a standard "TCP/IP" protocol. One of the most popular ways of communicating over the intersite is through a "web site" which is hosted on a suitable digital processing machine such as a personal computer, workstation, etc. Users or "clients" use, for example, their personal computers to communicate with a web site via a browser program or, simply, "browser." The most commonly used browsers are the Navigator™ from Netscape Communications, Inc., and the Internet Explorer™ from Microsoft, Inc.

It has become increasing simple for companies and individuals to create their own web sites. There are a number of commercially available packages which generate the necessary HTML code to create "web pages" which can be uploaded to web servers connected to the Internet. Connections to the Internet and web server hosts are often provided by a company known as an Internet Service Provider (ISP).

Since web pages are, essentially, programs written in the HTML language, it is possible that one or more web pages of a web site contains errors. These errors may only show up intermittently since much of the interaction with the web site can be dynamic, i.e. it can change from session to session. Therefore, the need has arisen for some method to test web sites for errors.

In FIG. 1, a system 10 for testing a web site includes a TCP/IP protocol network 12, such as the Internet, a web server 14 coupled to the Internet 12 by an ISP 16, any number of user or client machines such as client machines 18A, 18B, 18C, etc. coupled to the Internet 12 by ISP's 20A, 20B, 20C, etc., and a testing computer 22 coupled to the Internet 12 by an ISP 24.

In the prior art, software running on the testing computer 22 connects with a web site 26 hosted by the web server 14 through the Internet 12 and attempts to download web pages. Upon a failure to download a web page, the testing computer 22 running this prior art software detects an error.

It should be noted that a depiction of FIG. 1 is logical in nature, and may be implemented in a variety of fashions. For example, the testing computer 22 and the web server 14 can be the same machine. As another example, any of the client machines 18A, 18B, 18C, etc., or the testing computer 22, or the web server 14 can be connected into the Internet 12 in other fashions, such as into the "backbone" of the Internet. Further the Internet is only one example of a network 12 implementing a TCP/IP protocol. Other examples of TCP/IP protocol networks include intranets and extranets, as will be appreciated by those skilled in the art.

The testing computers 22 of the prior art include testing software which simulate browser software to the extent that they can download web pages. The successful downloading of a web page in the prior art was usually considered sufficient to determine that that web page was error free. In some instances, prior art testing computers 22 may examine or "parse" the HTML of the downloaded web page to make further determination whether there is an error in the downloaded web page. An example of prior art testing software includes the WhatsUp™ software of IpSwitch, Inc. of Lexington, Mass. (http://www.ipswitch.com). This software is capable of testing only a single web page.

Unfortunately, the simple downloading of web pages with, perhaps, a cursory examination of the HTML is often insufficient to determine all the errors that a user might encounter when actually interacting with those web pages. This is due, in part, to the complex interactivity permitted under the HTML standards, and is due, in part, to the fact that many interactions with web pages are "dynamic" in that they may change from session to session. It would therefore be desirable to have a method for testing a web site which can test multiple features of web pages, and which can handle dynamic interactions with the web site.

SUMMARY OF THE MENTION

The present invention provides a method, apparatus, and system for testing a web site. The invention handles a number of interactive modes with the web site being tested, and handles dynamic interactions with the web site.

A method for testing a web site in accordance with the present invention formulates a test configuration file comprising a series of test inquiries for a web site, initiates an HTTP communication to form a connection with the web site, and repetitively communicates with the web site. More particularly, the method repetitively communicates with the web site by receiving HTML from the web site, analyzing HTML for errors and storing the results in the database, and then formulating a new HTTP communication to the web site based upon the received HTML and the test configuration file.

The operation of formulating a test configuration file preferably includes sending HTML comprising a blank testing form to a web browser, receiving HTTP from the web browser as a submission from the testing form and developing the test configuration file from the HTTP received from the web browser. In this fashion, a standard web browser can be used as the interface between the test operator and the testing software. Preferably, the web browser can also be used to edit test configuration filed that has already been developed.

An apparatus for testing a web site includes a computer having memory and a processor, and a monitor object resigning at least partially in the memory and executed by the processor. The monitor object includes an initiator to establish an HTTP communication between the monitor object and a web site and a repetitive communicator which repeatedly receives HTML from the web server, analyses the HTML for errors and stores the results in a database, and formulates a new HTTP communication based on the received HTML. Preferably, the apparatus also includes a scheduler residing at least partially in the memory and executed by the processor which is operative to invoke the monitor object, determine whether the monitor object is scheduled to be run, and run the monitor object as scheduled to initiate the HTTP communication to form a connection with the web site by repetitively communicating with the web site.

A system for testing a web site includes a TCP/IP protocol network, a web server connected to the TCP/IP protocol network and hosting a web site, and a testing computer having memory and a processor that is connected to the TCP/IP protocol network. The testing computer is operative to formulate a test configuration file stored in the memory including a series of test inquiries for a web site to be tested, to initiate an HTTP communication to form a connection with the web site and to repetitively communicate with the web site by receiving HTML from the web site, analyzing the HTML for errors, and storing the results in a database, and formulating a new HTTP communication based upon the received HTML and test configuration file.

An advantage of the present invention is that a web site can be thoroughly tested in a variety of interactive modes. Also, the present invention allows for the testing of changeable or "dynamic" features of the web site. In consequence, the present invention facilitates the thorough testing of web sites for errors and generates reports which aids in the correction of the detected errors. Other advantages include the capability of immediately providing a notification of any problems, and the reporting of performance and service levels.

These and other advantages of the present invention will become apparent to those skilled in the art upon a reading of the following descriptions of the invention and a study of the several figures of the drawing.

BRIEF DESCRIPTION OF THE DRAWINGS

FIGS. 3A, 3B, 3C, 3D, and 3E illustrate a series of HTML web pages that will be used as an example when explaining the present invention;

FIGS. 4A, 4B, and 4C illustrate a blank form used to develop the testing configuration file of the present invention;

FIG. 6 is an exemplary test configuration developed by the process of the present invention from the web pages of FIGS. 3A–3E;

DETAILED DESCRIPTION OF THE PREFERRED EMBODIMENTS

Figure 1:
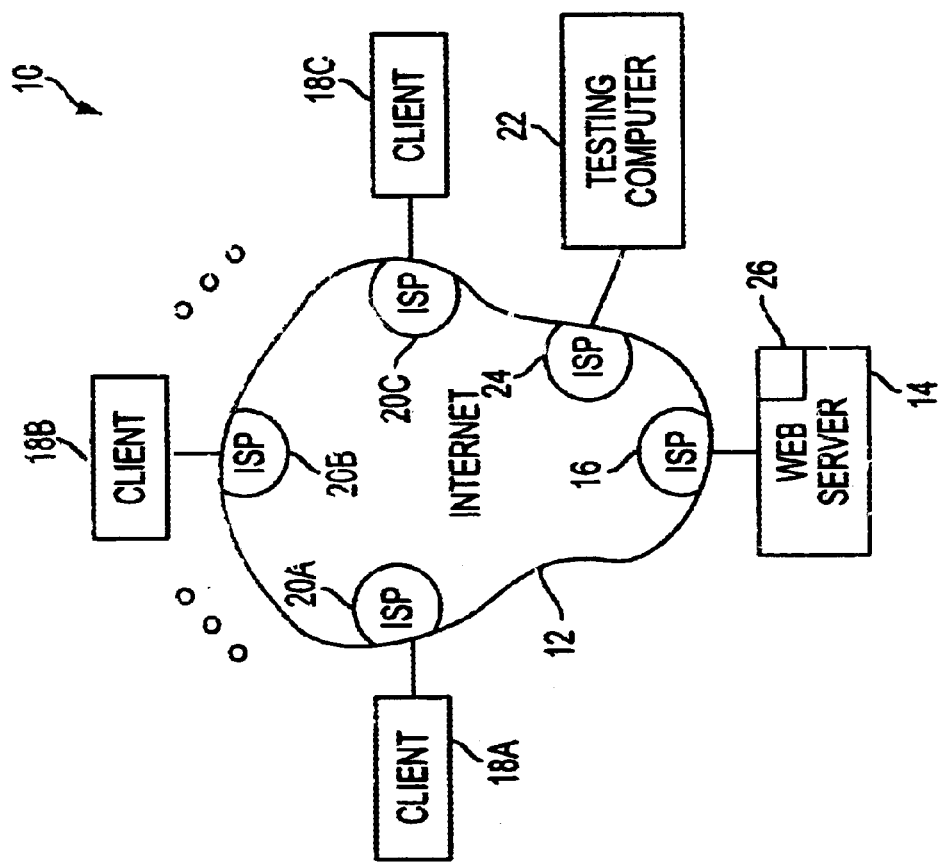
FIG. 1 is an illustration of a system including the Internet, a number of client machines, web server, and a testing computer.

FIG. 1 illustrates a system for testing a web site, wherein, a testing computer 22 implements a testing process. The differences in the system of the prior art and the system of the present invention is the software running on the testing computer 22, or elsewhere in the system.

Figure 2:
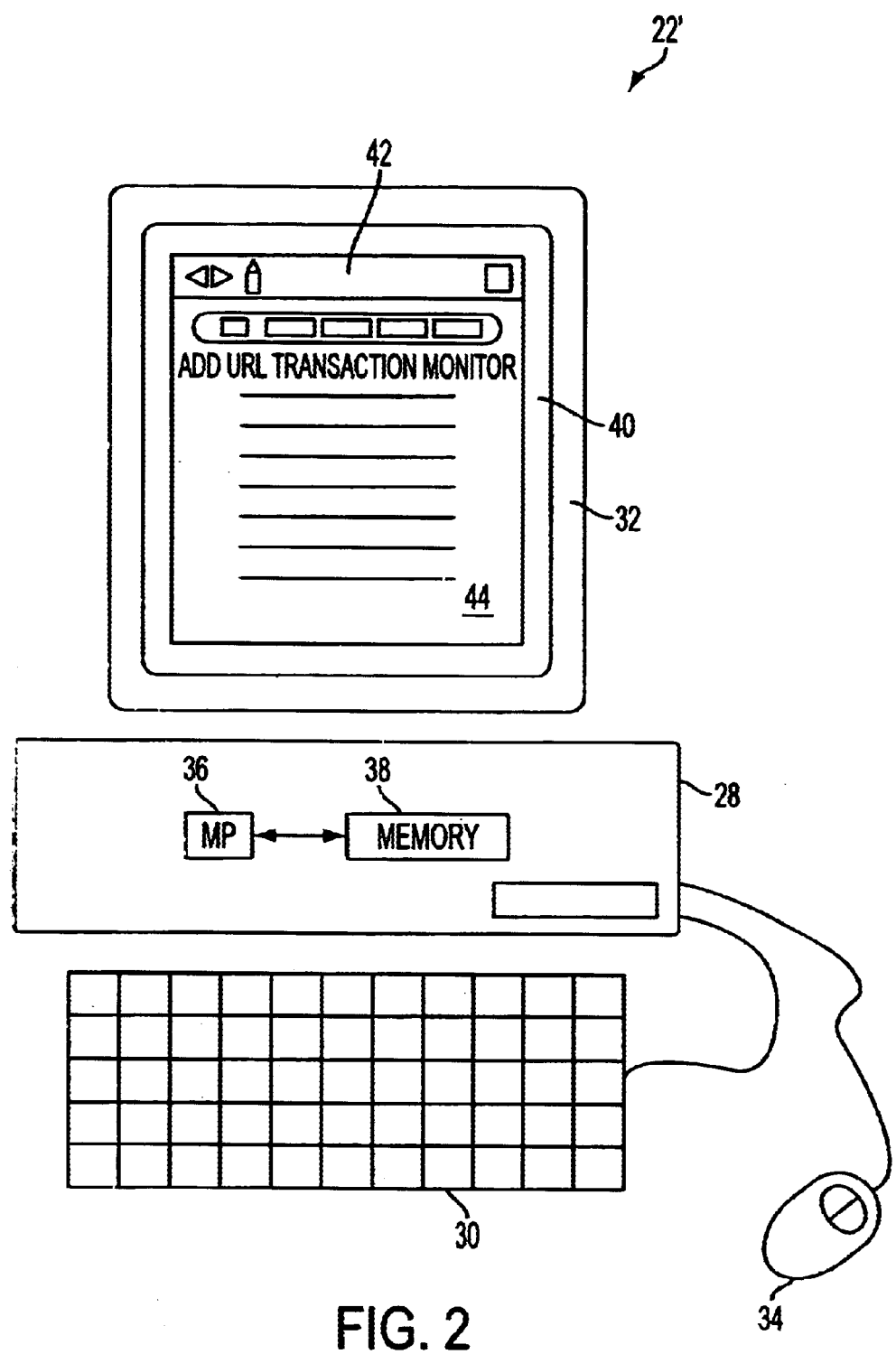
FIG. 2 is a pictorial representation of a testing computer 22' of the present invention.
Figure 2A:
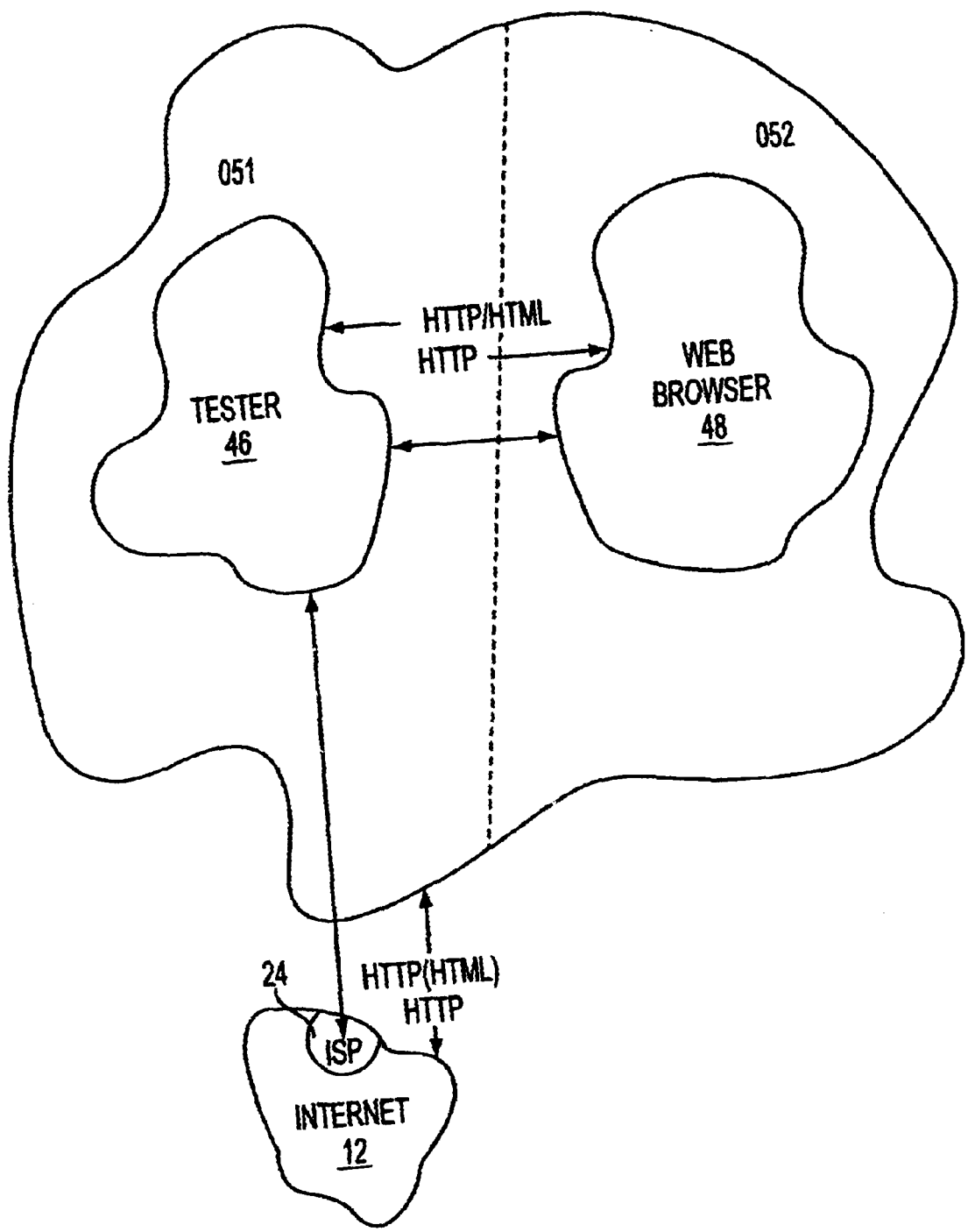
FIG. 2A is a pictorial representation of testing software implementing the present invention, as well as standard web browser software.

In FIG. 2 a computer apparatus 22' implements a process for testing a web site in accordance with the present invention. More particularly, an apparatus 22' of the present invention includes a computer 28, a keyboard 30, a video monitor 32, and preferably a mouse 34 or some other form of pointing device. As will be appreciated by those skilled in the art, the computer 28 includes a microprocessor 36 and computer readable memory 38 which support computer implemented processes. Displayed on the screen 40 of the monitor 32 is a web browser window 42 displaying a web page 44 of the present invention. The computer 28 and the peripherals 30, 34, and 40 comprise standard personal computer and workstation equipment, available from a variety of sources FIG. 2A illustrates the relationship of tester software 46 of the present invention to web browser software 48 and the Internet 12. More particularly, the tester 46 communicates directly with the Internet 12 through ISP 24. That is, the tester 46 can pass HTTP to the Internet 12 and receive HTTP/HTML from the Internet 12 without the need for an intermediary of a web browser. The tester 46 communicates independently with the web browser 48 by sending HTTP to the web browser 48 and by receiving HTTP/HTML from the web browser 48.

As suggested in FIG. 2A, the tester 46 and the web browser 48 can be implemented on the same computer apparatus ("machine") or on separate computer apparatus. The case where the tester and the web browser have been implemented on the same computer apparatus 22', they both can operate under the same operating system, i.e. OS1=OS2. However, in the instance where the tester 46 and the web browser 48 are implemented on different computer apparatus, there is no reason why the two can't be supported on different operating systems, i.e. OS1 might be different from OS2. For example, the tester 48 may be implemented under a personal computer operating system such as under Windows 95, while the web browser 48 might be implemented on another computer under a workstation operating system such as UNIX.

Figure 2B:
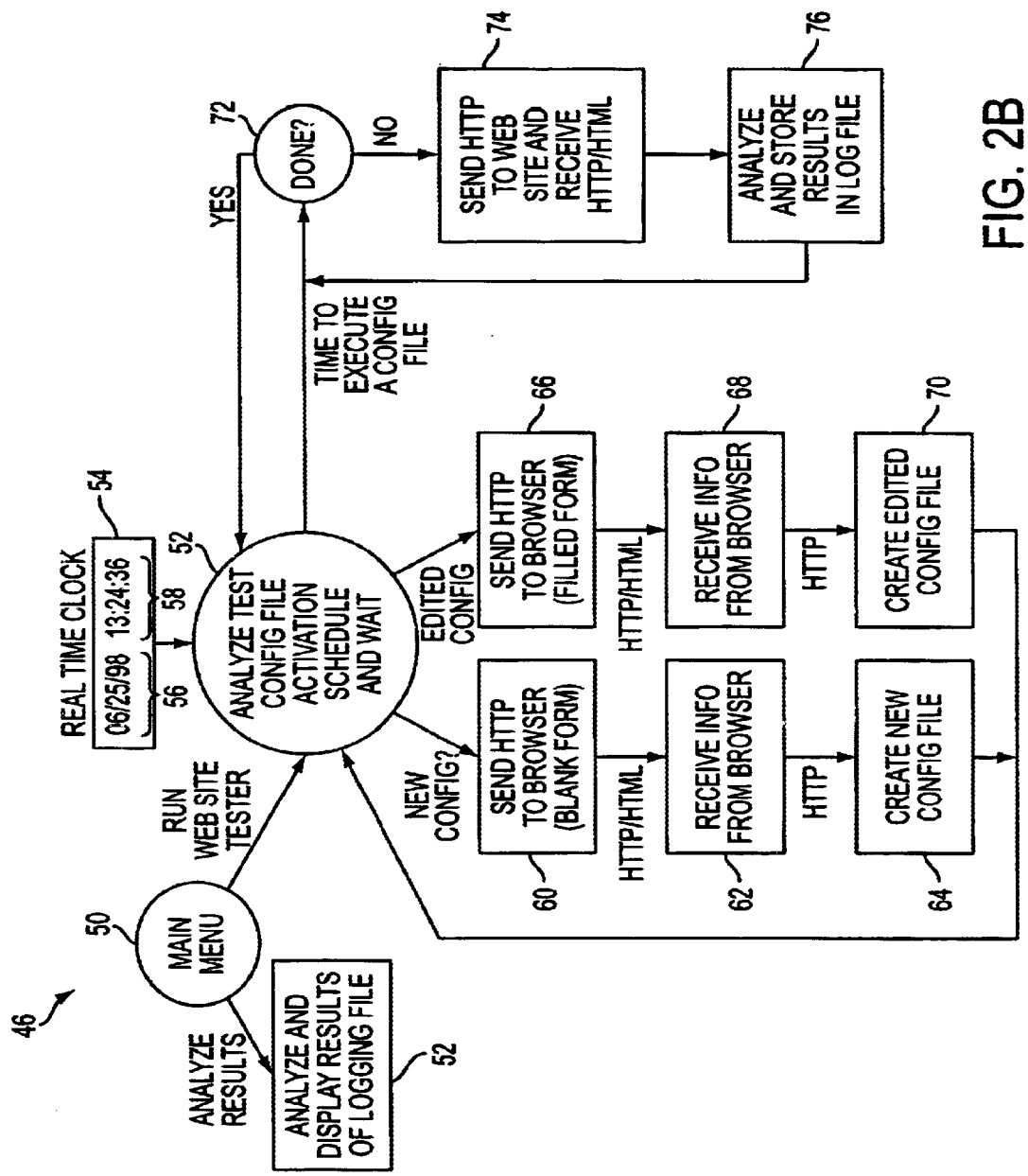
FIG. 2B is a flow-diagram illustrating the overall operation of the present invention.

In FIG. 2B, a flow-diagram illustrates various operations of the tester 46. At a main menu 50, it is determined whether the user wants to run the web site tester or to analyze results of previous web site tests. If it is determined that the user wishes to analyze results, a "logging file" or "log file" is analyzed and results are displayed in an operation 52. Statistical methods for analyzing data, and tabular and graphical methods for displaying data are well known to those skilled in the art and will not be described here. If, on the other hand, it is determined from the main menu 50 that the web site tester is to be run, an operation 52 analyzes a test configuration file, as well as an activation schedule. The operation 52 has, as an input, a real-time clock 54 which can provide a real-time date 56 and real-time hours, minutes, and seconds 58. Often, a real time clock 54 provides one long number that represents elapsed time from a given date and time, and which can then be algorithmically converted into date, hours, minutes and seconds.

If operation 52 detects that a new test configuration file is being requested via a web browser 42, a "blank form" is sent in the form of HTTP/HTML to the browser. After the blank form has been filled in by a user of the browser, the process receives the information from the browser in an operation 62. This is returned in a form of HTTP, as will be appreciated by those skilled in the art. Then, operation 64 is used to create a new test configuration file, and process control is returned to operation 52.

If, on the other hand, operation 52 determines that the user wishes to edit a test configuration file, a "Fig. Form" is sent via HTTP/HTML to the browser in an operation 66. The edit information is received from the browser in operation 68 in the form of HTTP. An operation 70 then creates the edited test configuration file, and process control is returned to operation 52.

When operation 52 determines that it is time to execute the configuration file by analyzing the activation schedule and by comparing the activation schedule to information received from the real-time clock 54, process control is turned over to operation 72 to determine whether the execution of the configuration file is completed. If so, process control returns to operation 52. If not, then operation 74 sends HTTP to the web site and receives, in turn, HTTP/HTML from the web site that is being tested. The HTTP/HTML is analyzed and the results are stored in a log file. In addition, the analysis of operation 76 determines the nature of the next HTTP transmission to the web site in operation 74. This analysis will be described in greater detail below.

In FIGS. 3A–3E, a number of exemplary web pages are presented to describe the process of the present invention. It should be noted this is just one example of a virtually unlimited number of web pages and web page combinations which can be tested by the process of the present invention.

In FIG. 3A an illustrated web page 78 is the "home page" of Freshwater Software, Inc. Among other features, it includes a series of buttons 80 which form "links" to other web pages. In particular, a button 82 makes a link to a "search" web page.

Figure 3B:

In FIG. 3B, the search web page 84 that was accessed by the button 82 of the home web page 78 includes a number of features including a data entry field 86 and a submit button 88. As seen in this example, the data entry field 86 includes the string "John", such that instances of the word "John" on the Freshwater Software web site will be found after the submit button 88 is activated. As is well known to users of web browsers, buttons such as buttons 82 and 88 are activated with a pointer device such as the mouse 34, or by pressing the "ENTER" key on a keyboard 30.

FIG. 3C shows a results web page 90 listing all of the instances including the string "John" that is on the Freshwater site.

Figure 3D:
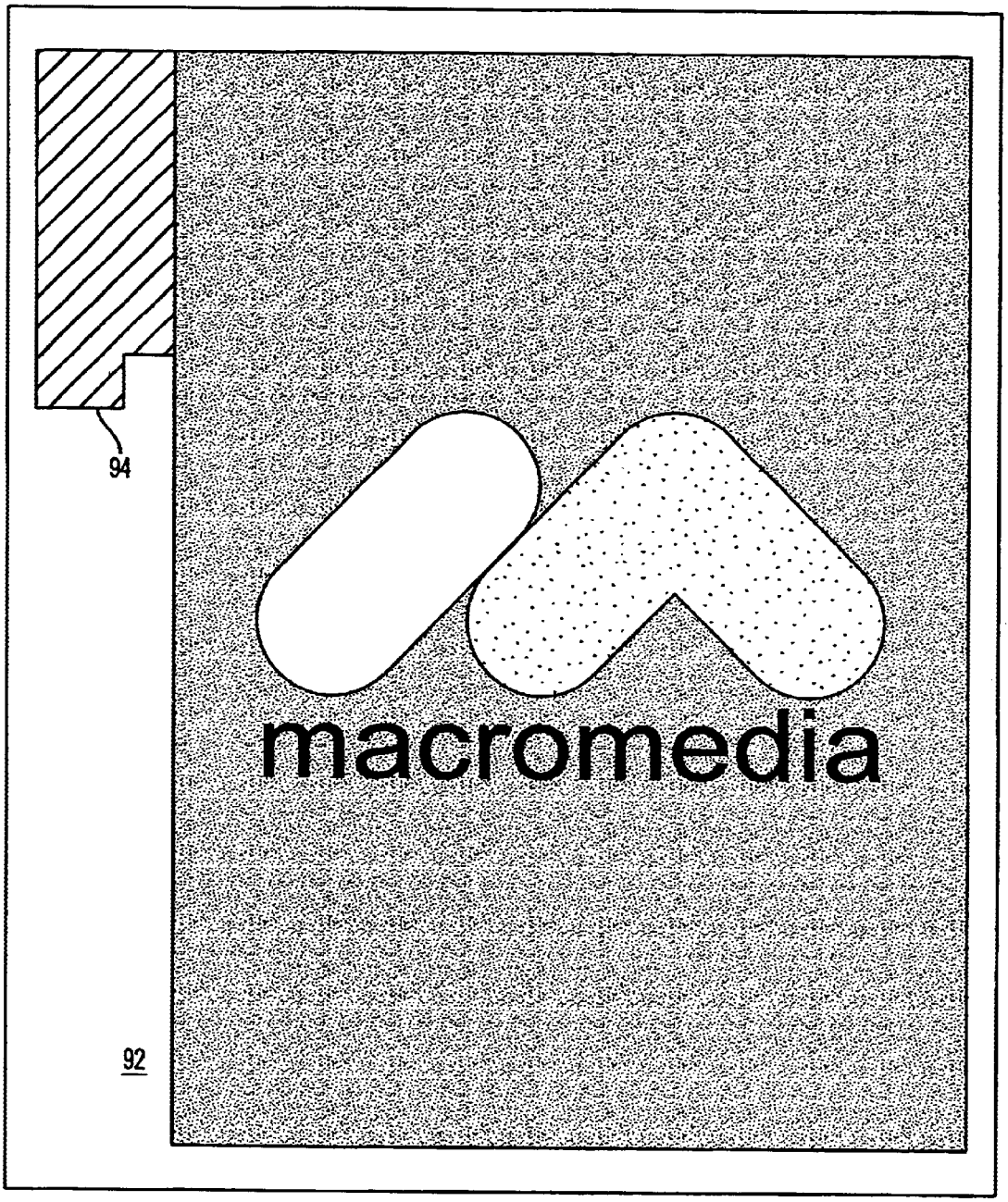
Figure 3E:
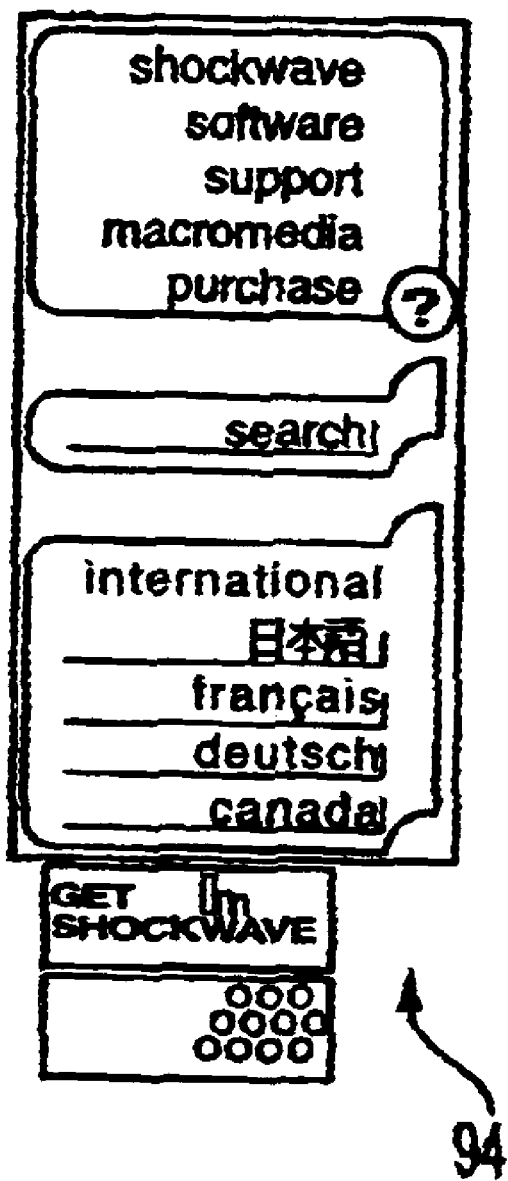

FIG. 3D illustrates a web page 92 for another company, Macromedia. A portion 94 of the web page 92 is a separate web page 94 as illustrated in FIG. 3E. This is an example of "framing" wherein a web page is embedded within another web page. Such "nesting" or "embedding" can occur to multiple levels, i.e. frames within frames within frames.

Figure 4A:
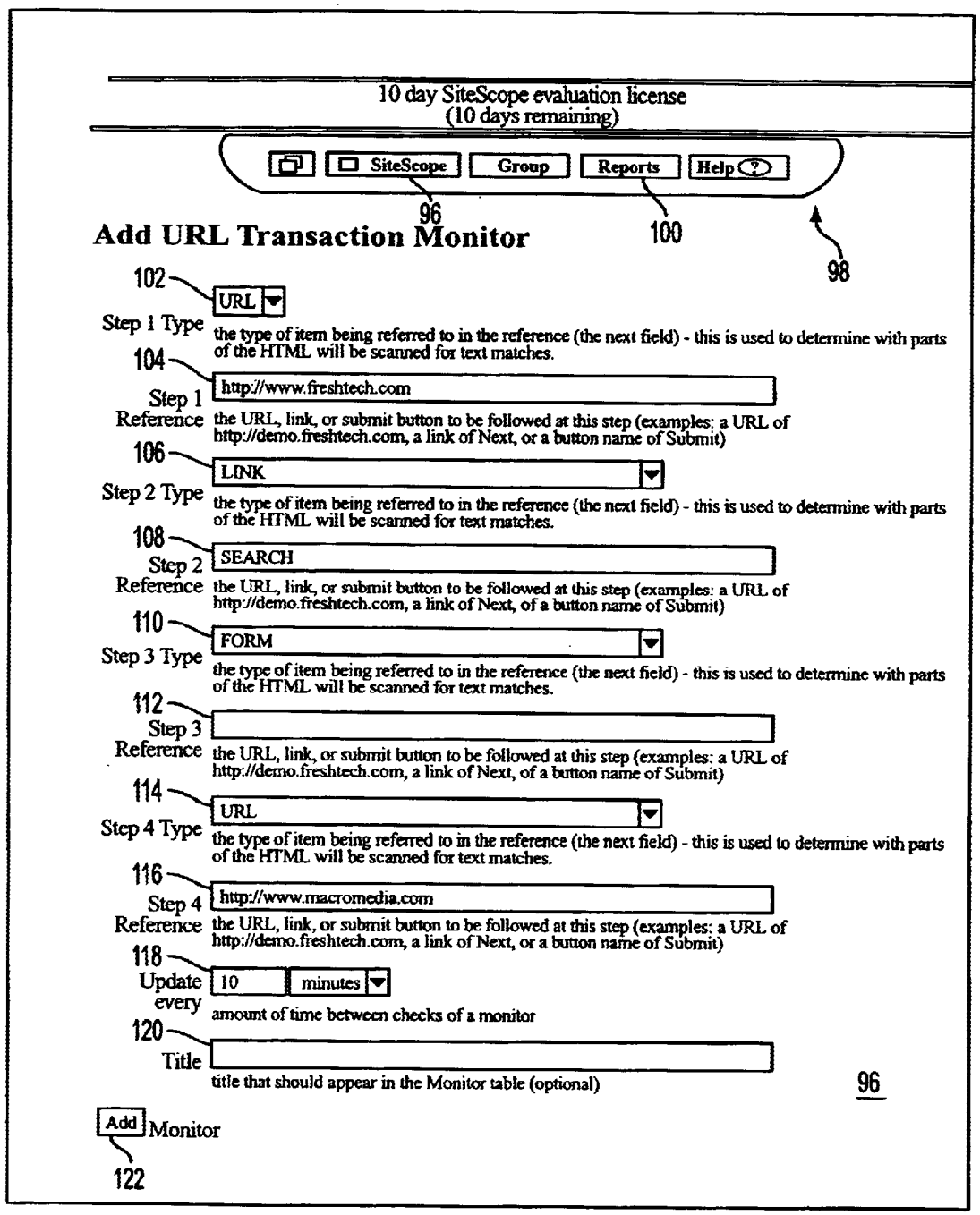

FIGS. 4A, 4B, 4C illustrate the web page 44 of FIG. 2 in greater detail. More particularly, these are the web pages used to create a "monitor object" which will be used to test and gather data concerning the operation of a web site under test. It should be noted that multiple monitors monitoring multiple web sites or monitoring a single web site in multiple fashions can be operating simultaneously. This is a well-known function of an object oriented programming and of a multi-tasking computer system. However, the following description will be in the context of creating a specific monitor an object which will test the functionality of the pages of FIGS. 3A–3E.

As noted in FIG. 4A, the "Add URL Transaction Monitor" refers to a number of steps. This particular web page 96 is created by activating the "SiteScope" button 96 of the button bar 98. Another button 100 labeled "Reports" can be used to generate test result reports. Therefore, it will be appreciated that the process 46 of FIG. 2B can utilize a web browser window 42 for user interface purposes.

Under step1 type, a pull down menu 102 is provided which has the entry of URL. This is because the step1 reference 104 must always be a URL to act as a starting point for the process. The URL can be the URL of a web site home page, or of any other web page. It is merely a starting point for the test. The step2 type pull down window 106 is a "link" to a button labeled "Search" as in a step2 reference 108. Step3 type is selected to be "Form" in pull down menu 110, while the entry field 112 of step3 reference is left blank. Step4 type in pull down window 114 is "URL", while the URL in field 116 is input as "http://www.macromedia.com." An update box 118 is set at every 10 minutes an optional title that would appear in the monitor table from the field 120 is left blank. A button 122 is activated if the monitor is to be created from this data.

In FIG. 4B, the web page 96 further includes a "disable" box 124 to temporarily disable the monitor sampling and alerting. Next, a step1 POST data field 126 has, as entries, "name=abc" and "address=deft". The data in the POST data field 126 is used to fill in field parameters. A step1 match content field 128 includes the string "Thank you for entering your name." A step1 "error if match" field 130 includes the string "invalid entry." A step 1 authorization user name 132 includes a user name Paul, and step1 password field 134 including a password "secret." Step2 POST data and step3 POST data can likewise be entered.

In FIG. 4C, the end of the step3 POST data and the step4 POST data can be seen on the remainder of page 96. Below the words "Verify Error" a different portion of the web page 96 is presented which is generic to other parts of the software of the present invention. More particularly, pull down menu 136 permits the update period of minutes, hours, days, etc. to be selected while entry filed 138 indicates the number of seconds, minutes, hours, etc. The update indicates the amount of time between checks whenever the status of the monitor indicates a problem.

A pull down menu 140 indicates a schedule for the monitor to be enabled. In this instance, it is selected to every day, all day. Alternatively, it could be scheduled for Monday through Friday, evenings only, etc. Custom schedules can be created by hitting the "edit schedule" button 142.

Fields 144 and 146 are optional fields which allows a user to enter monitor and report descriptions, respectively. A field 148 permits a time out period in seconds, to wait for the entire sequence to complete. That is, if a monitor session takes more than the time out period, an error or warning will be indicated.

The present invention also permits the use of a proxy server. The fields associated with an optional proxy server are shown at 150. In the field 150A, the HTTP proxy is entered. In field 150B, the proxy server user name is entered. In field 150C, the proxy server password is used.

A pull down menu 152 is used for the list order for the monitors. As noted previously, any number of monitor objects can be created to test multiple web sites or to test the same web site in multiple ways. The "list order" indicates where on a list of monitor objects the current monitor object is to be added. In this instance, the list order is "last". Other list orders include "first", "middle", etc.

The web page 96 also includes an "Error" pull down menu 154 and a "Warning" pull down menu 156. In this instance, an error is set if the status is not equal to 200, which is a default and a warning will occur if status is equal to –994, which is also a default. A status 200 means "good" and is associated with the status field of an HTTP request. The –994 default on the warning is an arbitrary internal coding indicating a software problem. For example, if the software takes more than 10 seconds to respond, a status –994 may be provided.

Figure 5:
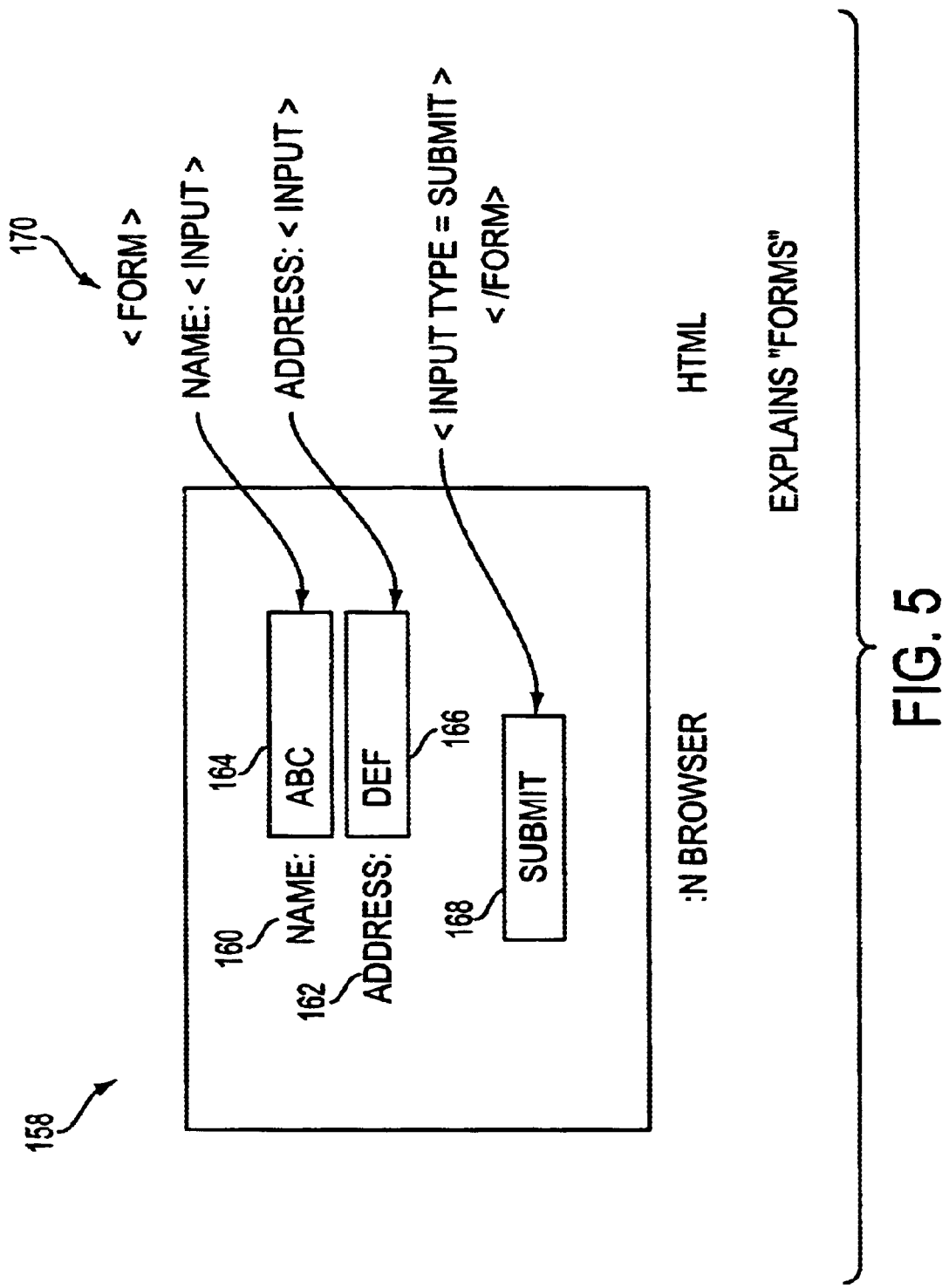
FIG. 5 is a illustration which helps an explain a HTML "form"

In FIG. 5, a form 158 is displayed to illustrate some of the concepts of the present invention. The form includes a first label 160 "name:" and a second label 162 called "address:". Associated with the labels 160 and 162 are entry fields 164 and 166, respectively. Also associated with the form is a "submit" button 168. The form 158 is as it may appear within a browser window. The HTML which creates the form 158 in the browser window is shown generally at 170. The use of HTML 170 to create a form 158 in a browser window is well known to those skilled in the art.

FIG. 6 illustrates a test configuration file 172 produced by filling out the web page 96 and hitting the "Add" monitor button 122. The test configuration file includes a number of labels or "tags" followed by an equal sign and either a parameter or a blank field. Where the field is blank, the tag is ignored and default values are used, if any.

As noted, the monitor description at 174 is an example of a five step transaction. Other tags such as frequency, time out, error frequency, etc. are filed in, while a number of tags are left blank. For example, since a proxy server is not being used, the tags for the proxy server are all left blank. The tags and parameters for step 1 are shown at 176. The "reference type I" tag is associated with the parameter "URL". The tag reference 1 is associated with parameter http://www.freshtech.com. Steps 2, 3, 4, and 5 are found at 178, 180, 182, and 184, respectively. It should be noted that the step2 type is "blank", the step3 type is "form", the step4 type is "URL" and the step5 type is "frame". Therefore, this example of a test configuration file 172 illustrates four of the main types of features which can be verified and tested by the process of the present invention.

Figure 7:
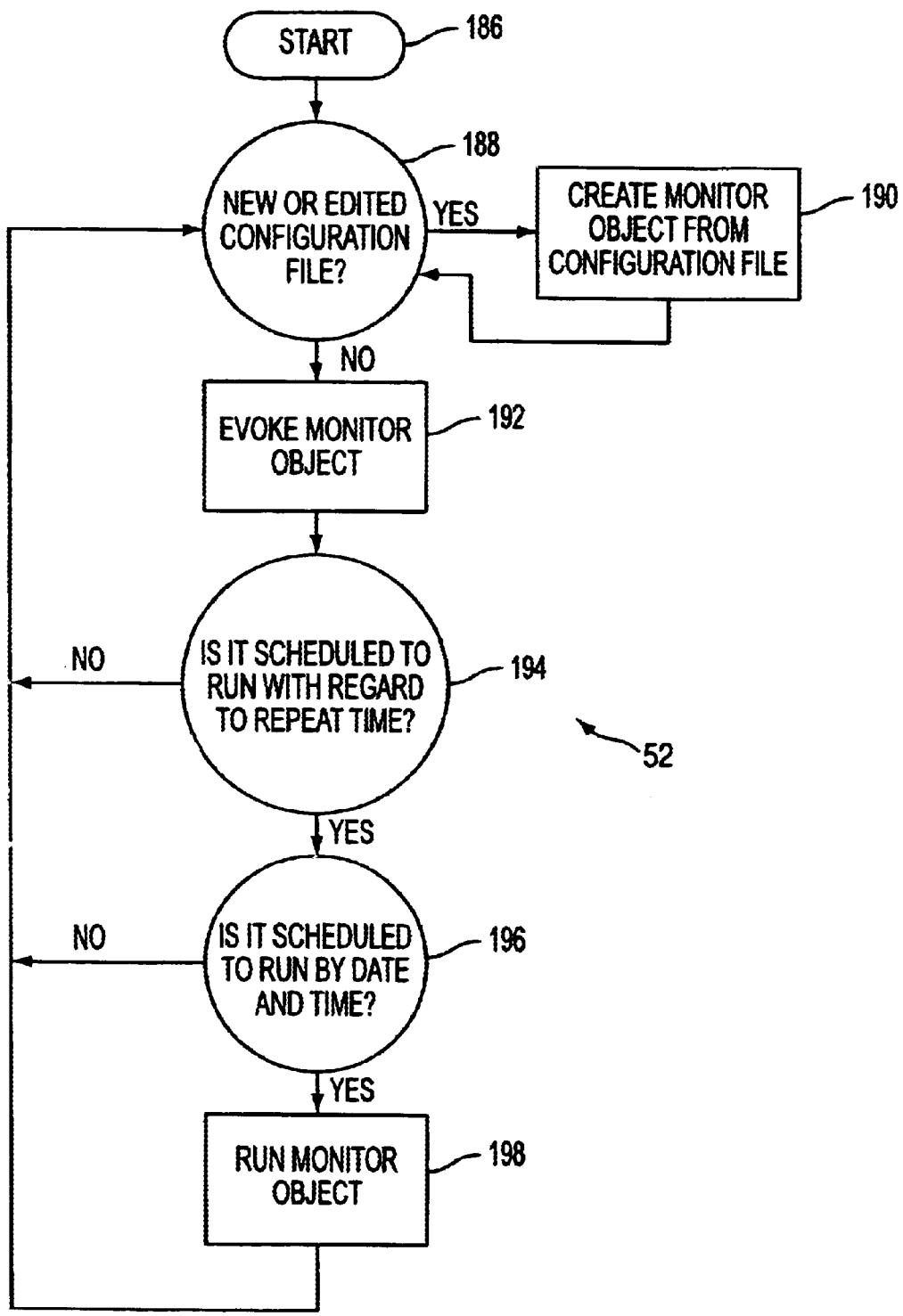
FIG. 7 is a flow-diagram illustrating the "ANALYZE CONFIGURATION FILE ACTIVATION-SCHEDULE" operation of FIG. 2B.

In FIG. 7, a flow diagram of the operation 52 in FIG. 2B is shown in greater detail. The process 52 begins at 186, and in operation 188, it is determined whether a new or edited configuration file has been created as set forth above. If so, a "monitor object" is created from the configuration file for one time execution in an operation 190. The creation and use of software objects are well known to those skilled in the art. Then, in an operation 192, the monitor object is "invoked". By invoked it is meant to end that the monitor object is activated for use. In an operation 194, it is determined whether the monitor object is scheduled to run with regards to repeat time. If it is not, process control is returned to operation 188. If it is, it is determined in operation 196 whether the monitor object is scheduled to run by date and time. If not, process control is again returned to operation 188. If the monitor object is scheduled to run with regards to both repeat time and by date and by time, then the monitor is "run" in an operation 198. By "run" it is meant that the monitor object is caused to perform the process of the present invention to test a web site.

Figure 8:
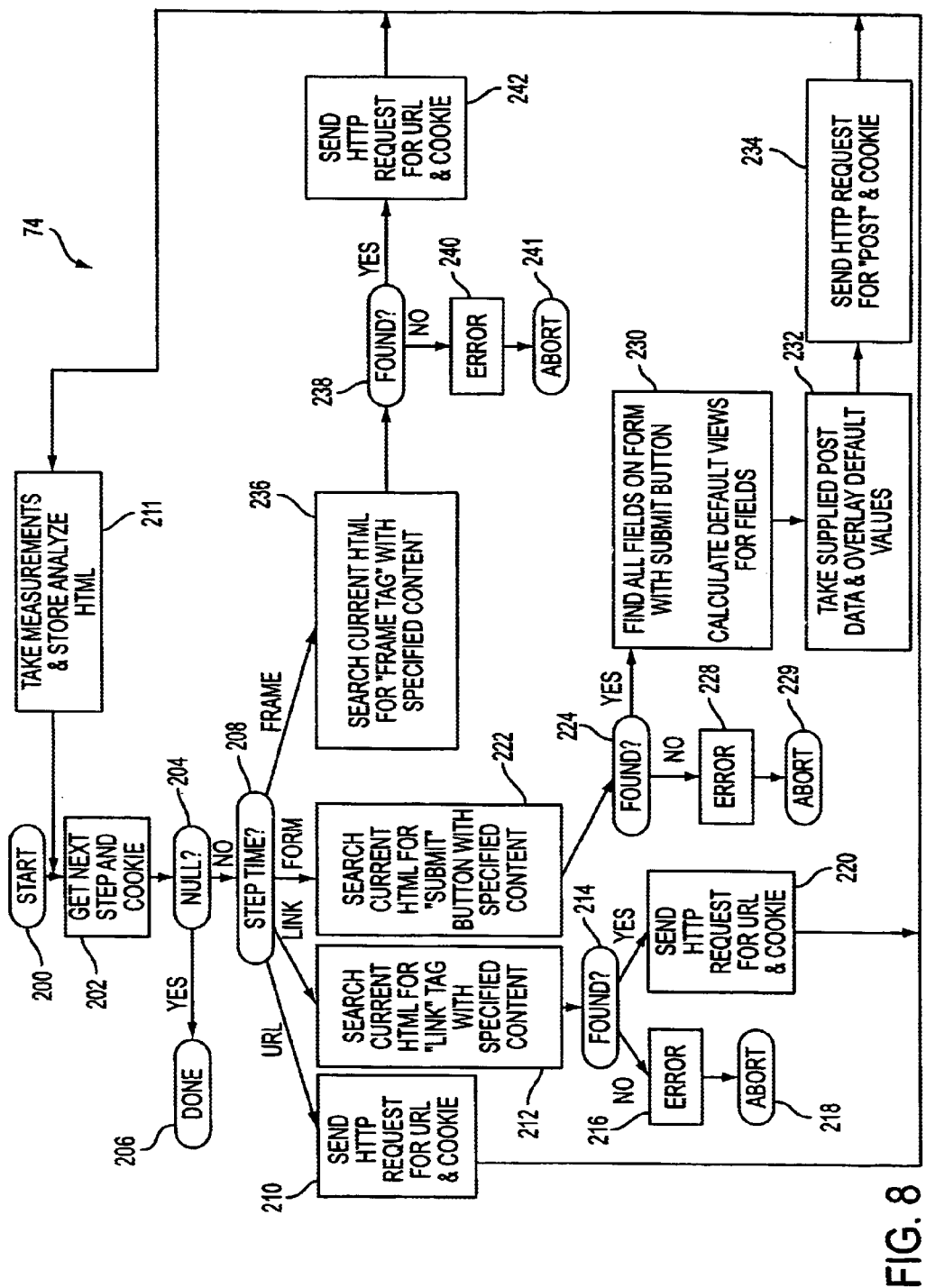
FIG. 8 is a flow-diagram of the "SEND HTTP TO WEB SITE AND RECEIVE HTTP/HTML" operation of FIG. 2B.

In FIG. 8, a flow diagram illustrates the process 74 of FIG. 2B in greater detail. The process 74 begins at 200, and in an operation 202, the "next step" and cookie is retrieved. The next step is the next test step as described above. The "cookie" is a data file received from the web site being tested that includes information concerning user preferences, user history, etc. An operation 204 determines whether the next step is a null and if so, the process is completed at 206. If there is a next step, operation208 determines the step type, as described below.

If operation 208 determines that the next step type is "URL" a step 210 sends an HTTP request for the URL and the cookie associated with that URL. Process control is then turned over to an operation 211 which takes measures based on the HTTP request and response, analyzes received HTML for expected content and errors using methods such as matching against string valves, regular expressions, and calculated valves and stores them in a database. Error analysis and matching methods are well known to those skilled in the art. Process control then returns to operation 202.

If operation 208 determines that the step type is a "link", an operation 212 searches the current HTML for a "link" tag having the specified content. In operation214 determines whether the appropriate "link" has been found and, if not, an error message 216 is generated the process aborts at 218. If the link is found by the operation 214, an operation 220 sends an HTTP request for the URL and the cookie and process control reverts to operation 211.

If operation208 determines that the step type is "form", an operation 222 searches the current HTML for a "submit" button with the specified content. An operation 224 determines whether the appropriate "submit" button has been found, and if not, operation 228 determines that there is an error and the process 76 aborts at 229. If the appropriate submit button is found by operation 224, an operation 230 finds all fields on the form with the submit button and determines or calculates the default values for this field. An operation 232 then takes the supplied post data and overlays the default values such that all appropriate fields have been filled. An operation 234 then sends an HTTP request "post" plus the cookie and process control returns to 211.

If operation 208 determines that the step type "frame" an operation 236 searches the current HTML for a "frame" tag. An operation 238 determines whether the appropriate frame tag has been found. If not, an operation 240 indicates an error and the process 76 aborts at 241. If the appropriate frame tag has been found by operation 238, an operation 242 sends an HTTP request for the URL and the cookie. Process control then returns to operation 211.

Figure 8A:
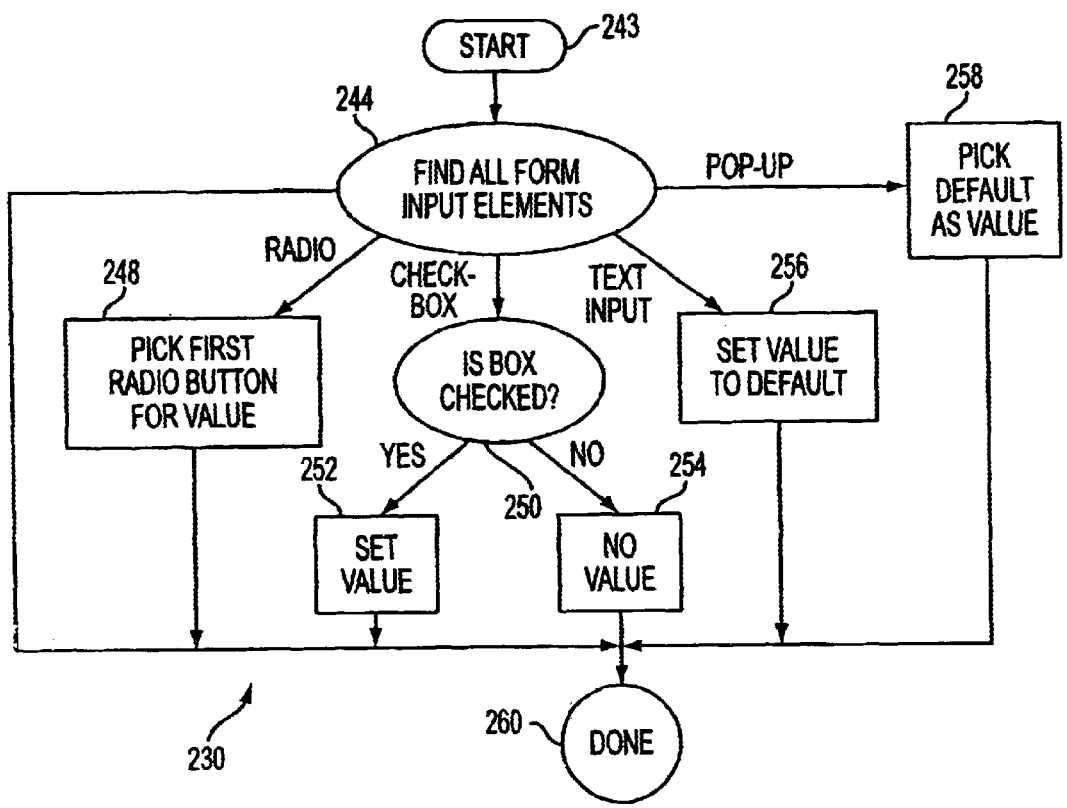
FIG. 8A is a flow-diagram detailing "FIND ALL FIELDS ON FORM WITH SUBMIT BUTTON" operation of FIG. 8.

In FIG. 8A, the operation 230 of FIG. 8 is described in greater detail. The process 230 begins at 243 and, in a operation 244, all form input elements are determined. If a form input element is not recognized, then the process is complete at 260. If operation 244 finds a radio button input element, operation 248 picks the first radio button for the value. If the operation 244 finds a check-box for the input element, an operation250 determines whether the box is checked. If it is, an operation 252 sets the value, and if it is not an operation 254 indicates that there is no value. If an operation 244 finds a text input element, an operation 256 sets the value to the default string. If operation 244 finds pop-up menu, an operation 258 picks the default as the value. The process 230 is then complete at 260.

Figure 8B:
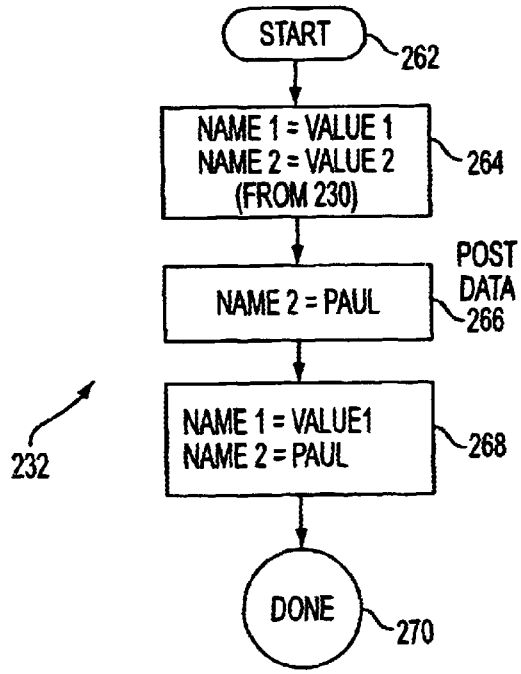
FIG. 8B is a flow-diagram illustrating the "TAKE SUPPLIED POST DATA AND OVERWRITE VALUES" operation of FIG. 8.

In FIG. 8B, the process 232 of FIG. 8 is illustrated in greater detail. The process 232 begins at 262 and, in an operation 264, values from operation 230 (see FIG. 8) are written into the name tags. For example, name1 is set to an arbitrary or default value1, name2 is set to an arbitrary or default value2, etc. Next, in an operation 266, the "post data" entered by the user is used to override the appropriate name tags. In this instance, the name tag "name 2" is set to the data "Paul". The final, merged data is illustrated at 268 and the process is completed at 270.

Figure 9:
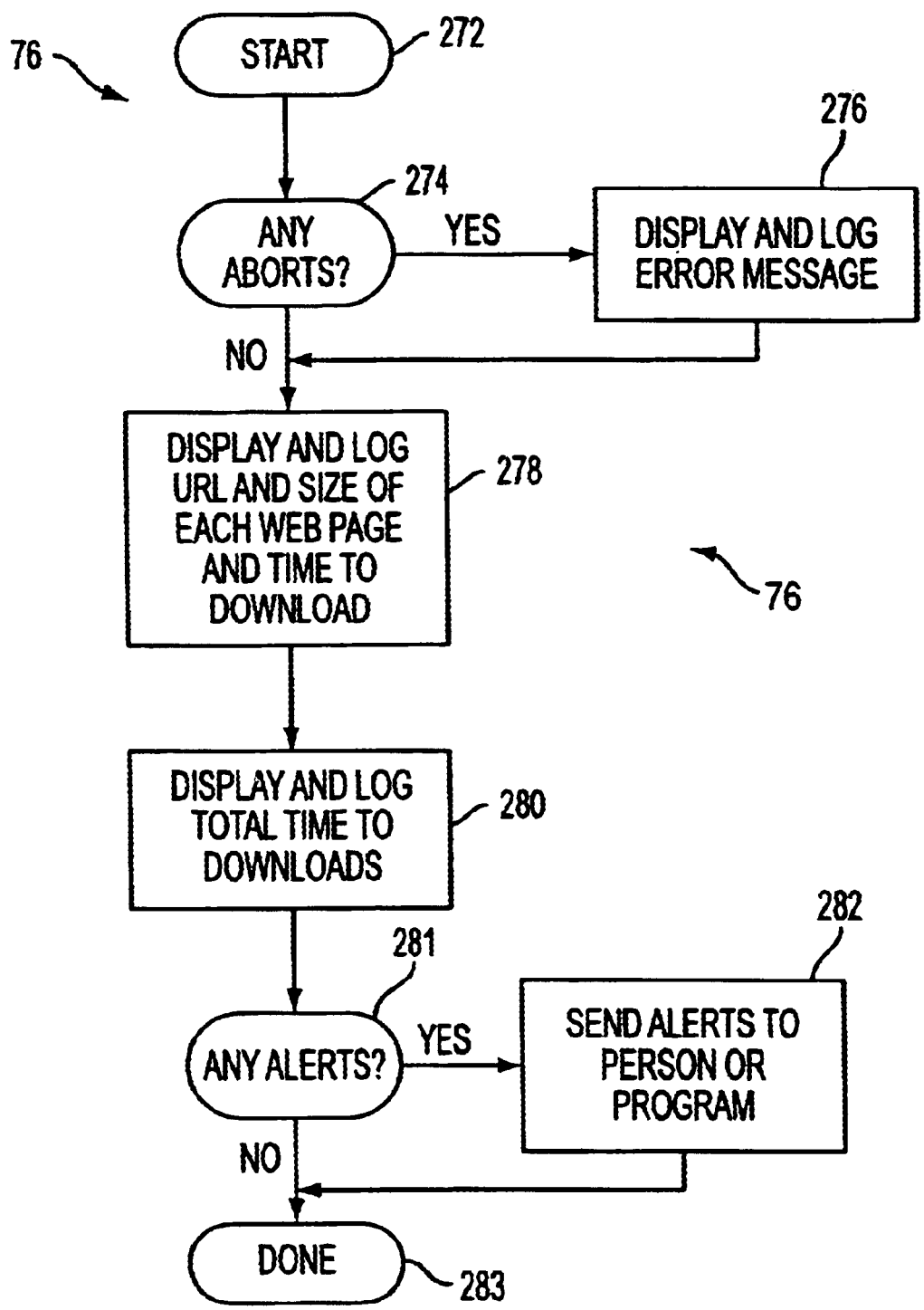
FIG. 9 is a flow-diagram illustrating the "ANALYZE AND STORE RESULTS IN LOG FILE" operation of FIG. 2B.

In FIG. 9, the process 76 of FIG. 2B is illustrated in greater detail. The process 76 begins at 272, and in an operation 274, it is determined whether there are any aborts that occurred within the process 74. If there were, an operation 276 displays and logs a an error message. If there were not any aborts, then the process 74 terminated normally in an operation 278, and the process displays and logs the URL and the size of each web page and the time it took to download into a log file. An operation 280 displays and logs the total time for the download in an operation 280. In an operation 281 it is determined whether there are any alerts. If there were, an operation 282 activates a process. The process would commonly notify a person using a mechanism such as e-mail or pager or cause a user-specified process to start. The process is then complete at 283.

While this invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. A method of testing a web site that is already in use on the Internet, the method comprising the computer-implemented acts of:
    using a testing mechanism that is remote from said web site for testing said web site;
    automatically testing a plurality of features of said web site by performing the sub-act of:
        dynamically interacting with said web site, wherein dynamically interacting comprises:
            performing content matching including matching against string values, regular expressions and calculated expressions.

2. The method as recited in claim 1, wherein the sub-act of dynamically interacting with said web site further comprises:
    dynamically interacting with each frame of said web site when said web site contains one or more frames.

3. The method as recited in claim 2, wherein dynamically interacting with each frame further comprises:
    submitting a request for a service at said each frame when said each frame offers one or more services;
    obtaining a result associated with said request; and
    evaluating said result for determining a service-level of said service.

4. The method as recited in claim 2, wherein dynamically interacting with each frame of said web site further comprises:
    selecting a link in said each frame of said web site if said each frame contains one or more links; and
    dynamically interacting with each nested frame, if any, that is nested in said each frame.

5. The method as recited in claim 1, wherein the sub-act of dynamically interacting with said web site further comprises:
    submitting a request for a service at said web site when said web site offers one or more services;
    obtaining a result associated with said request; and
    evaluating said result for determining a service-level of said service.

6. The method as recited in claim 1, wherein the sub-act of dynamically interacting with said web site further comprises:
    selecting a link in said web site if said web site contains one or more links.

7. The method as recited in claim 1, further comprises the acts of:
    generating one or more reports for reporting one or more detected errors, if any.

8. The method as recited in claim 1, further comprises the acts of:
    determining a performance level of said web site based on a result of said testing; and
    reporting said performance level.

9. The method as recited in claim 1, further comprises the acts of:
    automatically sending one or more alerts to notify of one or more detected errors when said one or more detected errors are detected.

10. A computer-readable medium carrying one or more sequences of instructions for testing a web site that is already in use on the Internet, which instructions, when executed by one or more processors, cause the one or more processors to carry out the steps of:
    using a testing mechanism that is remote from said web site for testing said web site;
    automatically testing a plurality of features of said web site by performing the sub-act of:
        dynamically interacting with said web site, wherein dynamically interacting comprises:
            performing content matching including matching against string values, regular expressions and calculated expressions.

11. The computer-readable medium as recited in claim 10, wherein the sub-act of dynamically interacting with said web site further comprises:
    dynamically interacting with each frame of said web site when said web site contains one or more frames.

12. The computer-readable medium as recited in claim 11, wherein dynamically interacting with each frame of said web site further comprises:
    selecting a link in said each frame of said web site if said each frame contains one or more links; and
    dynamically interacting with each nested frame, if any, that is nested in said each frame.

13. The computer-readable medium as recited in claim 11, wherein dynamically interacting with each frame further comprises:
    submitting a request for a service at said each frame when said each frame offers one or more services;
    obtaining a result associated with said request; and
    evaluating said result for determining a service-level of said service.

14. The computer-readable medium as recited in claim 10, wherein the sub-act of dynamically interacting with said web site further comprises:
    selecting a link in said web site if said web site contains one or more links.

15. The computer-readable medium as recited in claim 10, wherein the sub-act of dynamically interacting with said web site further comprises:
    submitting a request for a service at said web site when said web site offers one or more services;
    obtaining a result associated with said request; and
    evaluating said result for determining a service-level of said service.

16. The computer-readable medium as recited in claim 10, further comprises the acts of:

generating one or more reports for reporting one or more detected errors, if any.

17. The computer-readable medium as recited in claim 10, further comprises the acts of:
   determining a performance level of said web site based on a result of said testing; and
   reporting said performance level.

18. The computer-readable medium as recited in claim 10, further comprises the acts of:
   automatically sending one or more alerts to notify of one or more detected errors when said one or more detected errors are detected.

* * * * *